No. 705,307. Patented July 22, 1902.
F. B. SCHERMERHORN & G. E. MOFFETT.
ROTARY FAN BLOWER.
(Application filed July 5, 1901.)
(No Model.)
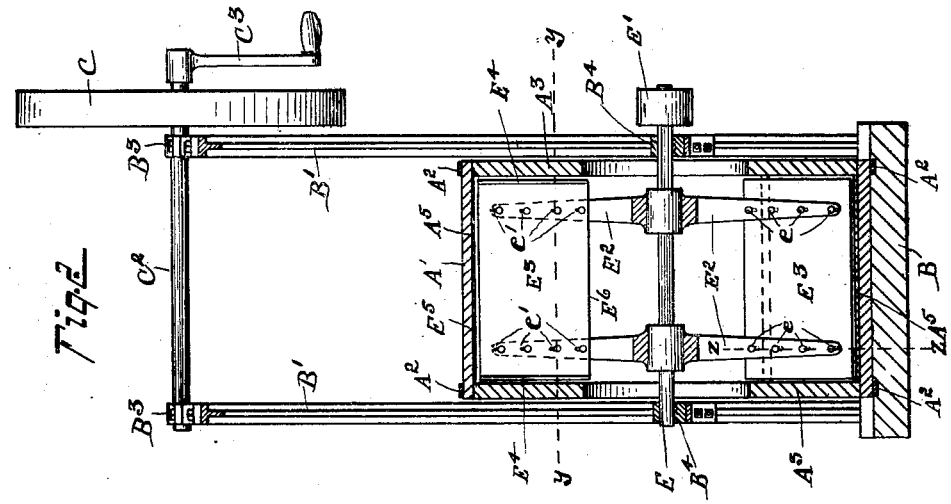
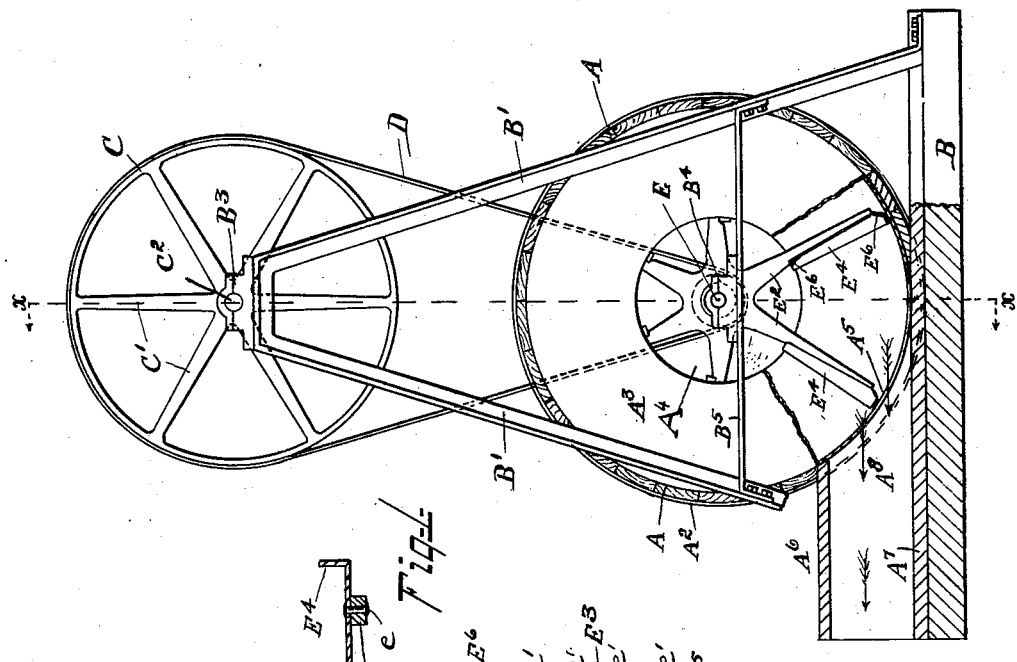
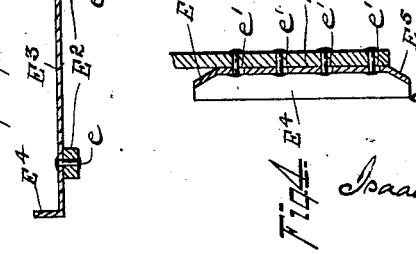
WITNESSES:
Walter C. Pusey.
Joshua Pusey,
INVENTORS
Francklyne B. Schermerhorn,
George Edwin Moffett
BY
Isaac W. Heysinger,
ATTORNEY

UNITED STATES PATENT OFFICE.

FRANCKLYNE B. SCHERMERHORN AND GEORGE EDWIN MOFFETT, OF JARILLA, TERRITORY OF NEW MEXICO.

ROTARY FAN-BLOWER.

SPECIFICATION forming part of Letters Patent No. 705,307, dated July 22, 1902.

Application filed July 5, 1901. Serial No. 67,118. (No model.)

*To all whom it may concern:*

Be it known that we, FRANCKLYNE B. SCHERMERHORN and GEORGE EDWIN MOFFETT, citizens of the United States, residing at Jarilla, in the county of Otero and Territory of New Mexico, have jointly invented a certain new and useful Improvement in Rotary Fan-Blowers, of which the following is a full, clear, and exact description, reference being had to the drawings which accompany and form a part of this specification, in which—

Figure 1 is a side elevation of a blower and its attachments embodying our invention, partially cut away at the lower part to show the blades and delivery-pipe, &c., in cross-section. Fig. 2 is a sectional view along the dotted line $xx$ of Fig. 1, the upright supports and power appliances above being shown in surface. Fig. 3 is a cross-sectional view of one of the blades, taken along the dotted line $yy$ of Fig. 2; and Fig. 4 is a vertical cross-sectional view of a similar blade, taken along the dotted line $zz$ of Fig. 2. $E^4$ $E^4$ $E^5$ $E^6$ represent the turned-up margins.

The lettering in all the figures is uniform.

Our invention relates to the construction of a rotary fan-blower for carrying currents of air or gases through suitable conduits into mines, excavations, tunnels, or various parts of buildings or the like where fresh or other air may be required, or to abstract air from confined areas and deliver it therefrom, so as to change or purify or cool or warm or otherwise modify the air or gases contained therein.

Referring to the drawings, B is a base or frame which supports the structure, from which rise the uprights B' B', to the upper part of which is journaled the shaft $C^2$, the journals being shown at $B^3$ $B^3$. The shaft $C^2$ carries the driving-pulley C, from which the belt D conveys power to the spindle E' or small pulley attached to the fan below. The spokes C' of the pulley connect the rim with the center; but other forms of driving device may be employed, if desired.

$C^3$ represents a handle on the shaft $C^2$ for communicating motion thereto and operating the blower. Instead of a handle other means of communicating motion may be employed, either hand, steam, or horse power, and this may be applied at one or both ends of the shaft $C^2$, if desired.

The barrel of the blower A is supported upon the base B and within the uprights B' B', Figs. 1 and 2, and a bracket $B^3$ extends across said barrel or cylinder A, on each side thereof, to which at $B^4$ is journaled the shaft E, which carries the fan-blades $E^3$ $E^3$, and around the said shaft E is an opening in the sides of the cylinder marked $A^4$, through which air is admitted from without by the draft of the blades when rotating and expelled tangentially through the passage-way $A^8$, formed by the casing $A^7$, which is prolonged in practice into a tube of muslin, hose, sheet metal, wood, or other suitable materal to a distance of hundreds of feet, if desired, and following such sinuosities or changes of direction as may be encountered.

The casing $A^5$ around the cylinder or barrel A we prefer to make of light sheet iron or steel seamed fast or otherwise secured to the sides $A^3$. Around this cylindrical casing we apply a lagging of wood, like barrel-staves and shown at $A^5$, Figs. 1 and 2. The sides we also prefer to make of wood, though they may be of metal, if desired. These segments of lagging we secure to the cylinder by means of the hoops $A^2$ $A^2$, applied at opposite ends of the staves, whereby we are enabled to make an exceedingly close contact between the blades and the inside of the cylinder by using light sheet metal and at the same time making it free from danger of battering by securely applying, one by one, the lagging-staves and securing the same by the hoops aforesaid. The construction is also extremely light, easily put up and taken down, and may be readily and cheaply built at distant places where transportation is difficult and tools and facilities hard to obtain.

To the shaft E are secured the radial arms $E^2 E^2$, (see Fig. 2,) arranged in pairs, as shown, and the pairs being four or six or eight or more in number, as may be desired. As shown in Fig. 1, there are six pairs of these arms in the machine illustrated in the drawings.

They may be made radially curved, if desired. To each pair of arms is secured a fan-blade $E^3$, so placed that it will be on the front side of the arms $E^2$ $E^2$ as the shaft is rotated. These fan-blades $E^3$ are in close contact, but without friction of actual contact with the concavity and sides of the barrel or cylinder inside which they rotate. The ends of these fan-blades, where they are nearly in contact with the flat sides of the cylinder $A^3$, are sharply turned up forward, as shown in Figs. 1, 2, and 3, at nearly or quite a right angle for a distance of about one-half inch from the margins. As shown in Figs. 1 and 4, the side margins at outside and inside of the blades, in a radial direction, are also turned up forward, but on an obtuse bevel from the flat of the blade proper. The blades themselves, as shown at $e\ e\ e\ e$ and $e'\ e'\ e'\ e'$, are adapted to be adjusted radially to make the exact contiguity required to the concavity of the cylinder. By reason of this turning up of the ends of the fan-blades a much more powerful blast can be produced by the same amount of power, since the current along the flat of the fan makes a channel of its own and prevents lateral pressure and frictional loss by pressure of air to escape through the sides and backward into the succeeding spaces. It makes an actual cyclonic sweep in accord with the pneumatic phenomena of rapidly-moving bodies like trains of cars in which the air-currents behind are carried forward instead of backward. The bevel at the shaft side of the blade cuts out the air fed in and prevents back pressure, while the peripheral bevel in the same direction projects the delivered air with a sharp throw forward into the delivery-pipe and assists in its propulsion and diminishes back pressure from beyond. The whole result is to make the moving masses of air under pressure and rotation separate columns moving as a whole, and thus not only discharge a greater volume, but prevent straining around the blades to the rear, and, in fact, make, to some extent at least, an actual suction forward around the blades from the radial spaces in the rear. In this way we are enabled to cheaply produce a very efficient blower and one operated with less power than those ordinarily in use and with greater results both in the delivery of the compressed air and in its transmission to much greater distances through tubes or pipes.

While we show an operative device in the drawings hereof, we do not rigidly confine ourselves to the precise construction shown and described, but vary the same to suit special requirements, as would be done by any mechanic skilled in the art to which our invention appertains, without the exercise of invention and without departing from the principles of our invention as herein shown, described, and claimed, nor do we in all cases turn up all the margins of the fan-blades in the same blower.

What we claim as our invention, and desire to secure by Letters Patent, is—

1. In a rotary fan-blower, in combination with a closed cylindrical chamber, having central openings in the sides thereof, and a peripheral discharge-opening, a shaft extended through said central openings, supported in journals, and provided with radial arms within said cylindrical chamber, and means for rotating said shaft and arms, a series of fan-blades secured to said arms at a suitable distance from said shaft, the sides and outer margins of said fan-blades in close contiguity to the inside of said chamber, said fan-blades having their ends turned up at an angle to the plane of their surfaces, and in the direction of rotation of the same, substantially as and for the purposes described.

2. In a rotary fan-blower having a cylindrical chamber, closed around the same and at the sides thereof, except at the center of said sides, and at some point of the cylindrical periphery, a shaft and radial arms adapted to rotate together, said shaft journaled to extend through said openings in said sides, and said arms radially extended therefrom within said chamber, in combination therewith a series of transversely-flat fan-blades secured to said radial arms, each of which has its peripheral margin turned forward in the direction of its rotation, at a bevel or obtuse angle from the plane surface of the body of said blades, substantially as and for the purpose described.

3. In a rotary fan-blower of the construction substantially as described, in combination with a cylindrical chamber having central openings in the flat sides thereof, and an exit from the curved periphery of said cylinder, a journaled shaft extended through said central openings, and means for rotating the same, and radial arms secured to said shaft and rotating therewith, together with a series of transversely-flat fan-blades secured to said arms, at a distance from said shaft corresponding to said central openings, and having their inner margins, parallel with said shaft, bent upward in a bevel, or at an obtuse angle in the direction of rotation of the same, substantially as described.

4. In a rotary blower a cylindrical chamber, central holes in the sides thereof, a peripheral exit-opening from said cylinder, a journaled shaft and radial arms within said chamber, means for rotating the same, and transversely-flat fan-blades secured to said arms having their ends, and transverse margins parallel with said shaft, turned up in the direction of rotation of said fan-blades, substantially as described.

5. In combination with the cylindrical chamber, substantially as described, shaft and radial arms within the same, and means for operating the same, a series of substantially flat fan-blades secured to said arms, and having their margins turned up in the direction of rotation thereof, substantially as described.

6. In combination with cylindrical chamber A, having central openings $A^4$ $A^4$, shaft E, radial arms, $E^2$ $E^2$ $E^2$ $E^2$, the transversely-flat fan-blades, $E^3$ $E^3$, having their margins turned up forward at an angle to the surfaces thereof, substantially as and for the purposes described.

FRANCKLYNE B. SCHERMERHORN.
    GEORGE EDWIN MOFFETT.

In presence of—
 J. F. COLES,
 J. H. COONS.